United States Patent [19]
Ottesen et al.

[11] Patent Number: 6,154,858
[45] Date of Patent: *Nov. 28, 2000

[54] IN SITU METHOD AND APPARATUS FOR DETECTING SURFACE DEFECTS TO IDENTIFY HANDLING DAMAGE IN A DISK DRIVE

[75] Inventors: Hal Hjalmar Ottesen; Gordon James Smith, both of Rochester, Minn.

[73] Assignee: International Business Machines Corporation, Armonk, N.Y.

[ * ] Notice: This patent is subject to a terminal disclaimer.

[21] Appl. No.: 09/062,073

[22] Filed: Apr. 17, 1998

[51] Int. Cl.⁷ .................................................. H05K 10/00
[52] U.S. Cl. .............................................. 714/42; 714/48
[58] Field of Search ............... 714/5, 8, 25, 42, 714/48, 718, 719, 720, 723

[56] References Cited

U.S. PATENT DOCUMENTS

| | | | |
|---|---|---|---|
| 3,771,143 | 11/1973 | Taylor | 360/25 |
| 5,422,890 | 6/1995 | Klingsporn et al. | 714/723 |
| 5,633,767 | 5/1997 | Boutaghou et al. | 360/53 |
| 5,661,615 | 8/1997 | Waugh et al. | 360/75 |
| 5,666,237 | 9/1997 | Lewis | 360/75 |
| 5,727,144 | 3/1998 | Brady et al. | 714/6 |
| 5,751,947 | 5/1998 | Arakawa | 714/54 |
| 5,828,583 | 10/1998 | Bush et al. | 702/185 |
| 5,935,261 | 8/1999 | Blachek et al. | 714/42 |

*Primary Examiner*—Dennis M. Butler
*Attorney, Agent, or Firm*—Joan Pennington

[57] ABSTRACT

A method and apparatus are provided for detecting handling damage in a direct access storage device (DASD). The DASD has at least two magnetic disk surfaces provided by at least one disk mounted for rotation, and a corresponding transducer mounted for movement across each disk surfaces. A predefined test is performed to identify magnetic surface defects on each of the disk surfaces. The identified magnetic surface defects are utilized to identify cosited defects on at least two magnetic disk surfaces. Responsive to identifying a predefined number of cosited defects on at least two magnetic disk surfaces, handling damage is reported to the user. The method for detecting handling damage is performed responsive to a user request and following predetermined events during use of the direct access storage device.

16 Claims, 9 Drawing Sheets

IN SITU METHOD AND APPARATUS FOR DETECTING SURFACE DEFECTS TO IDENTIFY HANDLING DAMAGE IN A DISK DRIVE

RELATED APPLICATION

The present invention relates to United States patent now U.S. Pat. No. 5,935,261 filed Jun. 5, 1997, by Michael David Blachek, Michael Allan Neumann, Gordon James Smith and Peter James Wachowiak, entitled METHOD AND APPARATUS FOR DETECTING HANDLING DAMAGE IN A DISK DRIVE (RO997-031) and assigned to the present assignee. The subject matter of the above identified patent application is incorporated herein by reference.

FIELD OF THE INVENTION

The present invention relates to a direct access storage device (DASD), and more particularly to an in situ method and apparatus for detecting surface defects to identify handling damage in a direct access storage device (DASD).

DECSCRIPTION OF THE RELATED ART

Direct access storage devices (DASDS) or hard drives are widely used with modern computers. Handling damage to hard drives may occur before the hard drives reach a computer manufacturer. Hard drives used in portable computers are prone to handling damage as a result of external impact to the portable computer. Often, the handling damage of a hard drive results in damage to the data area of a disk and can cause long-term reliability problems. Handling damage is the number one cause of warranty cost to major disk drive manufacturers.

With the susceptibility to handling damage that recording devices demonstrate today, a significant need exists for the detection of handling damage of a hard drove. Effective detection of handling damage could eliminate the long-term reliability problems resulting from the installation and continued use of such damaged drives.

SUMMARY OF THE INVENTION

A principal object of the present invention is to provide an improved in situ method and apparatus for detecting surface defects to identify handling damage in a direct access storage device (DASD). Other important objects of the present invention are to provide such method and apparatus substantially without negative effects; and to provide such method and apparatus that overcome many of the disadvantages of prior art arrangements.

In brief, a method and apparatus are provided for detecting handling damage in a direct access storage device (DASD). The DASD has at least two magnetic disk surfaces provided by at least one disk mounted for rotation, and a corresponding transducer mounted for movement across each disk surfaces. A predefined test is performed to identify magnetic surface defects on each of the disk surfaces. The identified magnetic surface defects are utilized to identify cosited defects on at least two magnetic disk surfaces. Responsive to identifying a predefined number of cosited defects on at least two magnetic disk surfaces, handling damage is reported to the user.

In accordance with features of the invention, the method for detecting handling damage is performed responsive to a user request and following predetermined events during use of the direct access storage device.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
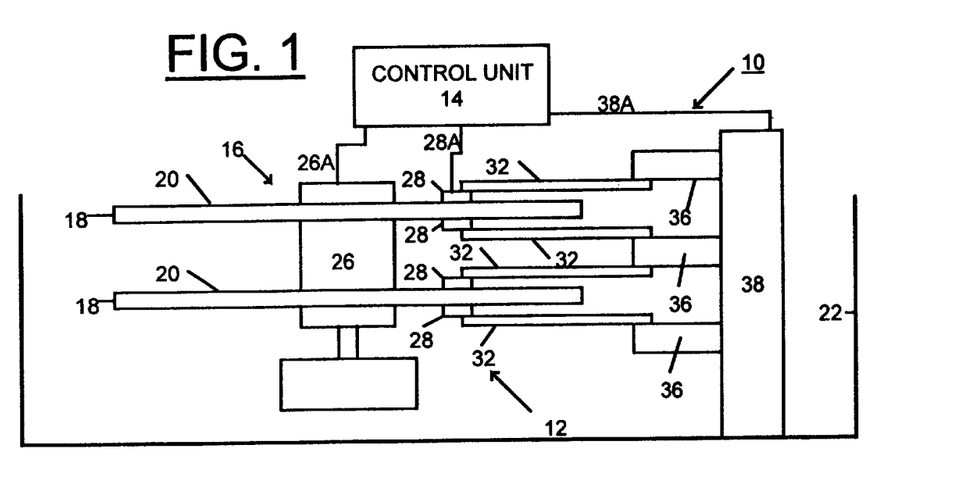
FIG. 1 is a schematic and block diagram of a data storage disk file embodying the present invention.
Figure 2:
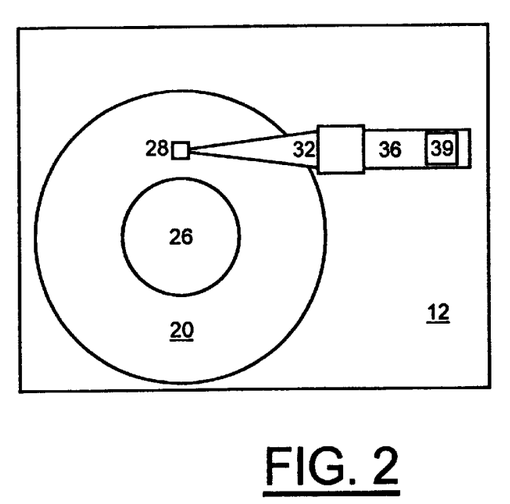
FIG. 2 is a schematic and block diagram showing the accessing mechanism for a single disk surface of the apparatus of FIG. 1.

Having reference now to the drawings, in FIGS. 1 and 2 there is illustrated a data storage disk file generally designated as 10 including a rigid magnetic disk drive unit 12 and an interface control unit generally designated as 14. Unit 12 is illustrated in simplified and diagrammatic form sufficient for an understanding of the present invention. The utility of the present invention is not restricted to the details of a particular drive unit construction.

The disk drive unit 12 includes a stack 16 of disks 18 each having at least one magnetic surface 20. The disks 18 are mounted parallel to one another within a housing 22 for simultaneous rotation on and by an integrated spindle and motor assembly 26. Information on each magnetic disk surface 20 is read from or written to the disk surface 20 by a corresponding transducer head assembly 28 movable in a path having a radial component across the rotating disk surface 20.

Each transducer head assembly 28 is carried by an arm 32. The arms 32 are ganged together for simultaneous pivotal movement by a head drive servo motor 38 including a voice coil 39 cooperating with an internal magnet and core assembly. Drive signals applied to the voice coil 39 cause the arms 32 to move in unison to position the transducer head assemblies 28 in registration with information storage tracks on the disk surfaces 20 where information is written or read.

A dreaded event in the disk drive unit 12 is a head crash which typically renders the disk file 10 useless with permanent loss of all valuable data stored in the drive. Any mechanical surface damage caused by the head slider or transducer head assembly 28 usually releases a certain amount of debris. Head crashes are commonly precipitated by accumulation of debris on the head air-bearing sliders, causing a loss of aerodynamic lift resulting in the head flying lower. Lower flyheight means more intermittent mechanical contact between the slider and the disk surface. This intermittent contact causes more surface damage and resulting debris that collect on the slider and further reduces the flyheight. Typically the process accelerates until the transducer head assembly 28 crashes.

Disk files 10 used in mobile computing are more susceptible to external shocks and vibrations. This also implies that the disk drive units 12 are much more prone to mechanical surface damage and thus more likely candidates for a head crash. For example, one scenario of the cause of mechanical surface damage is an in-use laptop computer that slides off a tray table in an airplane during a sudden air turbulence and hits the floor. In accordance with a feature of the invention, an unfortunate user advantageously is alerted if any surface damage had occurred in the notebook computer. Otherwise, a pending head crash with the catastrophic loss of data could result.

The disk drive unit 12 is controlled in operation by signals provided by the control unit 14, including motor control signals on line 26A and head position control signals on line 38A. In a typical arrangement, control unit 14 provides an interface with a computer that provides data read and write commands, and data signals are transmitted to or from the transducer head assemblies over corresponding lines 28A, one of which is seen in FIG. 1. Servo position information is recorded on the disk surfaces 20, and the transducer head assemblies 28 read this servo information to provide a servo position signal to the control unit 14. This information is employed by the control unit 14 to provide position control signals on line 38A. The purpose of this position feedback system is to assure accurate and continuous positioning of the transducer head assemblies 28 so that data is written to and read from precise locations on the disk surfaces 20.

Figure 3:
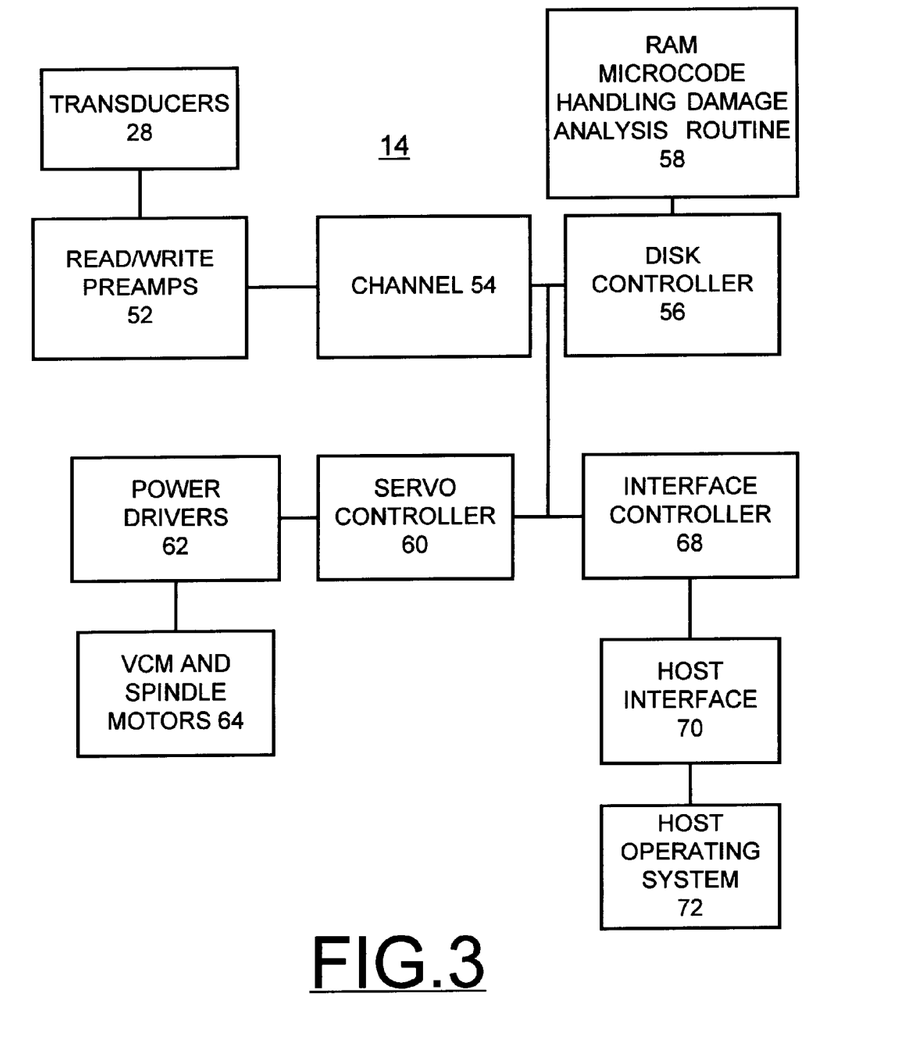
FIG. 3 is a block diagram of a data channel of the data storage disk file of FIG. 1 embodying the present invention.

Referring now to FIG. 3, there is shown a block diagram functional representation of the disk file control unit 14 for carrying out the handling damage detection methods of the invention. Servo information and customer data are read by the R/W transducers 28 and amplified by read/write preamplifiers (preamps) 52. A data channel 54 uses known sampling techniques for detecting the readback signals from the disk surface 20 that contain the customer data. An embedded disk controller 56 coupled to a random access memory (RAM) 58 is coupled to the data channel 54 and a servo controller 60. The RAM 58 stores microcode defining a handling damage analysis routine in accordance with the preferred embodiment. The servo controller 60 performs servo control functions providing servo positioning control signals to a power drivers block 62 coupled to the VCM and spindle motors 64. An interface controller 68 coupled to the embedded disk controller 56 performs interface processor functions. A host interface 70 is coupled to the disk controller 56 via the interface controller 68. A host operating system 72 is coupled to the host interface 70 for invoking predetermined handling damage analysis by the disk file 10 in accordance with the preferred embodiment.

In accordance with features of the invention, predetermined handling damage analysis defined by RAM microcode routine 58 are performed by disk file control unit 14 to determine if the disk file 10 has been damaged due to mishandling both before installation and after installation while in use in a host data processing system. After a DASD 10 is installed in the host system, handling damage analysis are periodically performed. The stored microcode routine 58 advantageously runs initially after a DASD is installed in the host system and when selected by a user to determine if damage has occurred. If a disk file 10 has handling damage, then the DASD 10 is not used or would be replaced due to the reliability risk.

The axially aligned transducer head assemblies 28 move in the same arc across each of the disk surfaces 20. The transducer heads 28 are positioned over the same cylinder number and sector number on each surface 20, even if the sectors are physically skewed. When the disk drive is hit by an external force, the dynamic reaction of the sliders or transducer head assemblies 28 referred to as head slaps, cause disk damage on more than one surface 20. Since the shock is usually momentary, the surface damage will occur in the same vicinity (cylinder number, sector number) on two or more disk surfaces 20. This type of damage is referred to as cosited surface damage. Having two randomly cosited defects on two separate surfaces is a very rare random event. Thus, if cosited defects are detected in the G-list, then their origins are very highly likely due to physical head/disk contacts.

In accordance with features of the invention, damage alert notification may be accomplished by application of a simple method of the preferred embodiment. Most commercially available disk drives store a standard primary defect list (P-list) and a grown defect list (G-list) in a protected area of the disk drive, often referred to as disk defect logs. The P-list is generated for each disk file 10 at manufacturing time and stores information of specific locations of magnetic surface defect sites and the alternate site for storing data. The G-list is generated and periodically updated while the disk drive is in use including stored information of grown defects that occurred after manufacturing. P-lists and G-lists or other similar surface analysis test (SAT) results for all disk surfaces 20 advantageously are used to identify physical surface damage in the disk file 10. The P-list and G-list are typically referenced to logical servo sector locations. It should be understood that when the physical sector location is different from the logical sector location, then a logical-to-physical sector map is established for each surface. Physical defect maps are used to determine the presence of physically cosited defects.

In accordance with features of the invention, analysis of surface defects caused by mechanical contacts reveal that these physical contacts cause variation in the head/disk spacing and magnetic surface damage that both contribute to disk defects that appear in the P-list or G-list. Any variation in head/disk spacing caused by a surface bump or a pit will cause large changes in the head readback signal. Large variations in the head readback signal will cause defect entries in the P-list or G-list. The magnetic properties of the disk coating are very sensitive to mechanical damage and are detected as magnetic defects and stored in the P-list or G-list. Mechanical defects also cause magnetic surface defects and are subsets of the magnetic defects in the P-list or G-list. From analysis of standard P-lists and G-lists by application of the method of the invention, it is possible to in-situ assess the nature of disk surface damage from any disk drive unit 12 from various disk drive manufacturers. The generation and maintenance of P-lists and G-lists is often provided through a surface analysis test (SAT) procedure. SAT provides precise disk defect locations based on the read signal from a recording head.

By application of the method of the invention handling damage during manufacturing is determined from a search of the P-list for two or more cosited surface defects. As a result, immediate feedback advantageously is provided to the production line process and the stations where the damage occurred. Handling and accidental damage to the disk drive unit 12 from external shocks or crash stop hits are determined in-situ by similar analysis of the G-list. This information advantageously is used for warranty purposes and to alert the user after an accident that an unsafe disk drive situation exists, where the disk drive unit 12 may crash in the near future. After handling damage is detected, replacement of the disk drive unit 12 or alternatively frequent backup of information stored in the disk drive unit is suggested. After an accident, only the updated portion of the G-list generated after the accident needs to be analyzed.

In accordance with features and advantages of the invention, the requirement for special test equipment, test stations, and resources is eliminated. The method of the invention is field up-gradable and can be applied to various available disk drives. The application of the method of the invention is particularly desirable for disk drive units 12 in mobile computing environments. Available components of the disk file 10 are used so that virtually no additional cost is required to implement the method of the invention on any existing disk drive, while providing a substantial benefit to a user.

Application of the method of the invention reduces the chance of a user losing valuable data due to a head crash after a predefined number of cosited defects are detected in the G-list. Also to extend the life of the disk drive 12 after a mishap, a circumferential zone radially centered at the cosited defects and of a width equal to the footprint of the slider or transducer head assembly 28 in that location, is defined as a no-idle-zone (NIZ). Data is moved to alternate cylinders outside the NIZ. Evasive maneuvering of the cosited detects can be invoked if the NIZ is crossed during a seek operation. This method could also be used in the loading zone for a load/unload disk drive. At manufacturing time, a data pattern can be written in the loading zone area such that G-list information can be obtained and analyzed for cosited defects.

Figure 4:
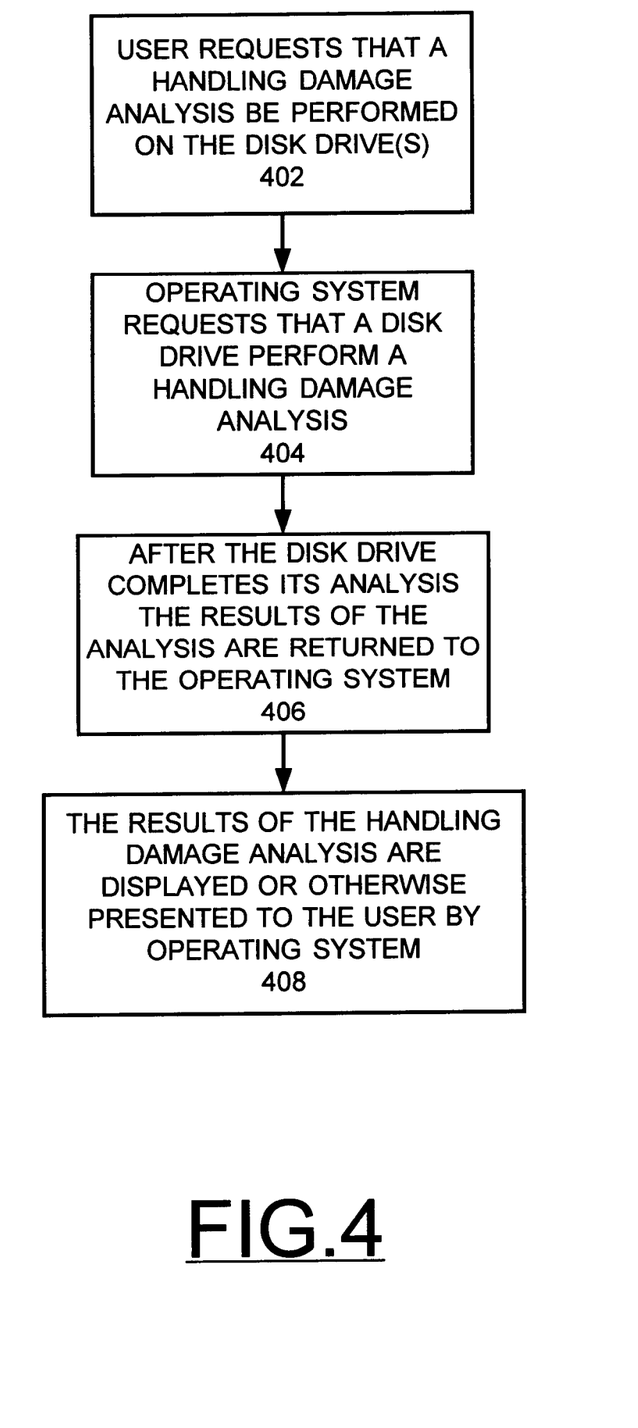
FIG. 4 is a flow diagram illustrating sequential steps for invoking a handling damage analysis routine in the data storage disk file of FIG. 1 in accordance with the present invention.

Referring now to FIG. 4, there is shown a flow diagram illustrating sequential steps for invoking the handling damage analysis routine in the data storage disk file 10 in accordance with the present invention. As indicated at a block 402, a user requests that handling damage analysis be performed on one or more disk files 10 so that the handling damage analysis routine is performed immediately. The host operating system 72 requests that a disk file 10 perform a handling damage analysis routine as indicated at a block 404. After the disk file 10 completes the handling damage analysis, the results of the handling damage analysis are returned to the operating system 72 as indicated at a block 406. Then the results of the handling damage analysis are displayed or otherwise presented to the user by the host operating system 72 as indicated at a block 408. For example, when the results indicate handling damage based upon detected cosited defects in the updated G-list, an immediate transfer of data from the damaged disk drive unit 12 followed by a replacement of the disk file 10 would be recommended to avoid risking a pending head crash event.

Figure 5:
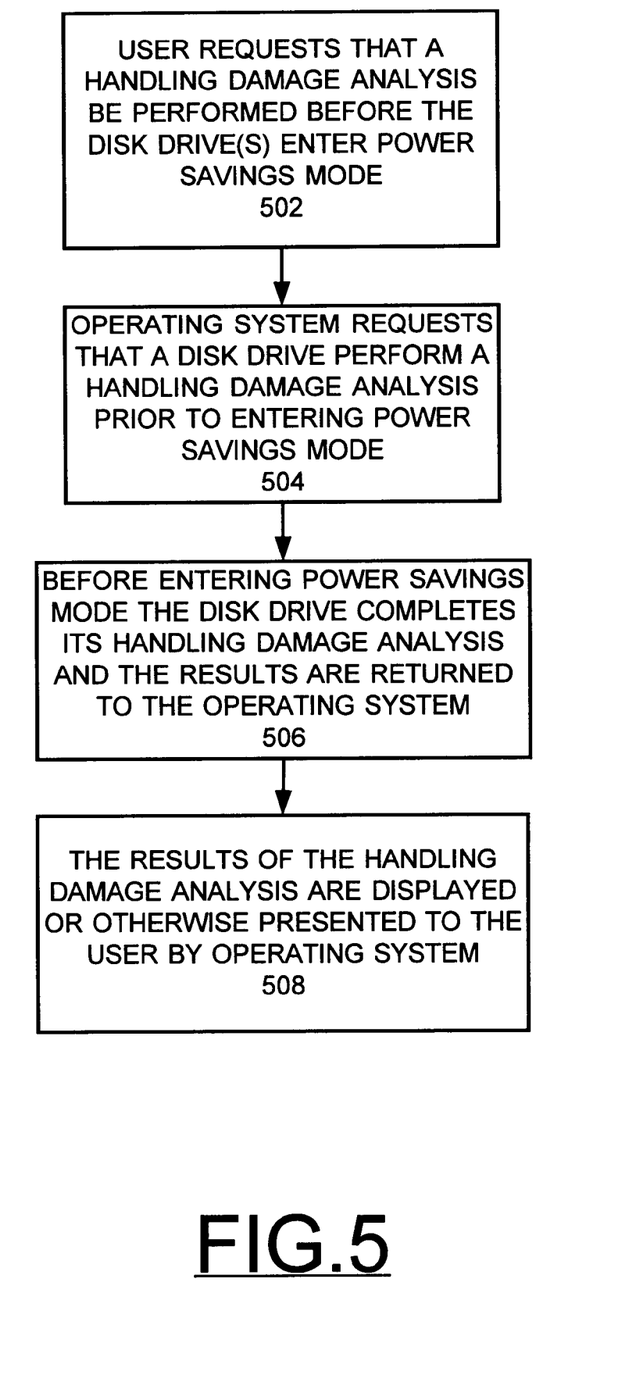
FIG. 5 is a flow diagram illustrating alternative sequential steps for a invoking handling damage analysis routine in the data storage disk file of FIG. 1 in accordance with the present invention.

Referring now to FIG. 5, there is shown a flow diagram illustrating alternative sequential steps for invoking the handling damage analysis routine in the data storage disk file 10 in accordance with the present invention. As indicated at a block 502, a user requests that handling damage analysis be performed on one or more disk files 10 before the disk drive unit 12 enters a power savings mode. The host operating system 72 requests that a disk file 10 perform a handling damage analysis routine before entering a power savings mode as indicated at a block 504. After the disk file 10 completes the handling damage analysis before the disk drive enters a power savings mode, the results of the handling damage analysis are returned to the operating system 72 as indicated at a block 506. Then the results of the handling damage analysis are displayed or otherwise presented to the user by the host operating system 72 as indicated at a block 508.

Figure 6:
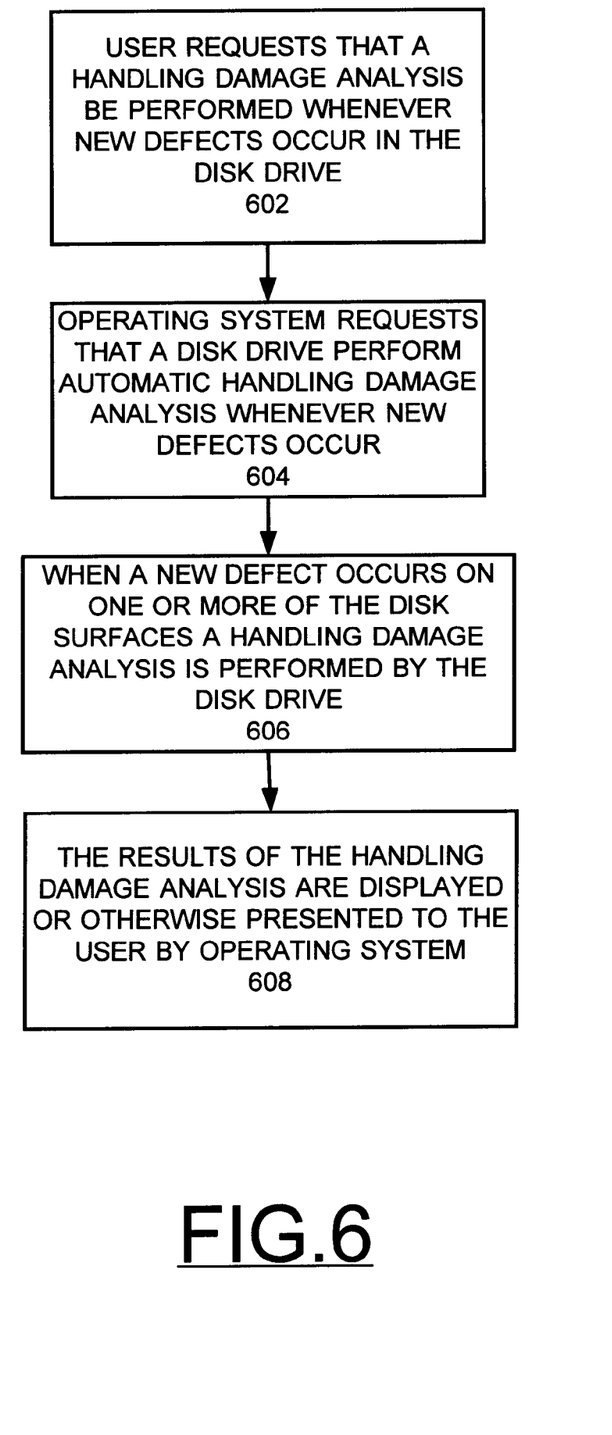
FIG. 6 is a flow diagram illustrating further alternative sequential steps for invoking a handling damage analysis routine in the data storage disk file of FIG. 1 in accordance with the present invention.

Referring now to FIG. 6, there is shown a flow diagram illustrating further alternative sequential step)s for invoking the handling damage analysis routine in the data storage disk file 10 in accordance with the present invention. As indicated at a block 602, a user requests that handling damage analysis be performed on one or more disk files 10 whenever new defects occur in the disk drive. The host operating system 72 requests that a disk file 10 perform a handling damage analysis routine whenever new defects occur in the disk drive as indicated at a block 604. Whenever a new defect occurs on one or more of the disk surfaces in the disk drive unit 12, the disk file 10 performs the handling damage analysis and the results of the handling damage analysis are returned to the operating system 72 as indicated at a block 606. Then the results of the handling damage analysis are displayed or otherwise presented to the user by the operating system 72 as indicated at a block 608.

Figure 7:
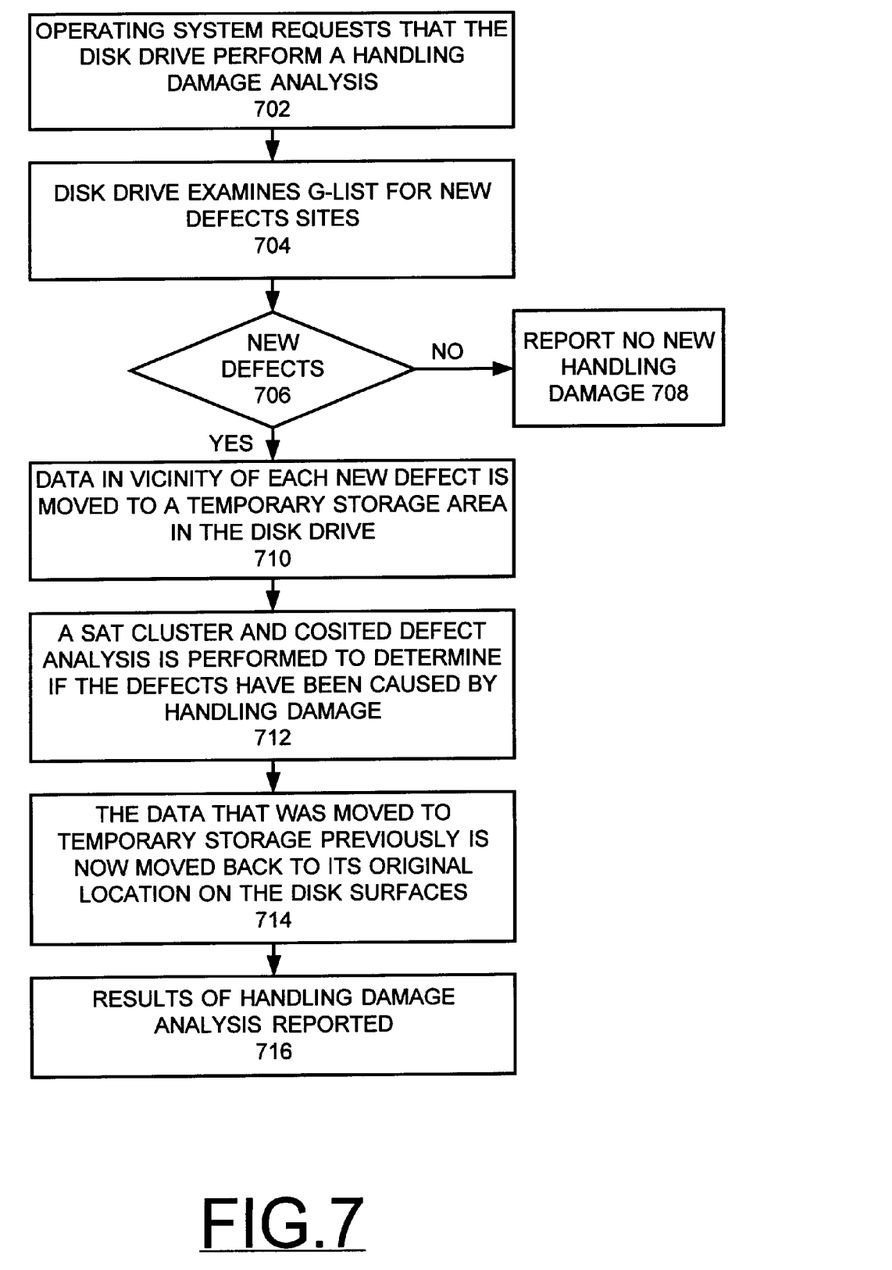
FIG. 7 is a flow diagram illustrating sequential steps for detecting handling damage in the data storage disk file of FIG. 1 in accordance with the present invention.

Referring now to FIG. 7, there is shown a flow diagram illustrating sequential steps for detecting handling damage in the disk file 10 in accordance with the present invention. Sequential operations start at block 702 when the operating system 72 requests that the disk file 10 perform a handling damage analysis routine. As indicated at a block 704, the disk file 10 examines the G-list for new defect sites. As indicated at a decision block 706, checking for new defects is performed. If no new defects are identified, then no new handling damage is reported as indicated at a block 708. Otherwise if new defects are identified, then data in the vicinity of each new defect is moved to a temporary storage area in the disk file 10 as indicated at a block 710. A surface analysis test (SAT) cluster and cosited defect analysis is performed to determine if the defects have been caused by handling damage as indicated at a block 712. The data that previously was moved to temporary storage is now moved back to its original location on the disk surfaces 20 as indicated at a block 714 or another defect free location depending on the severity of the surface damage. Then the results of the handling damage analysis is reported to the user as indicated at a block 716.

Figure 8:
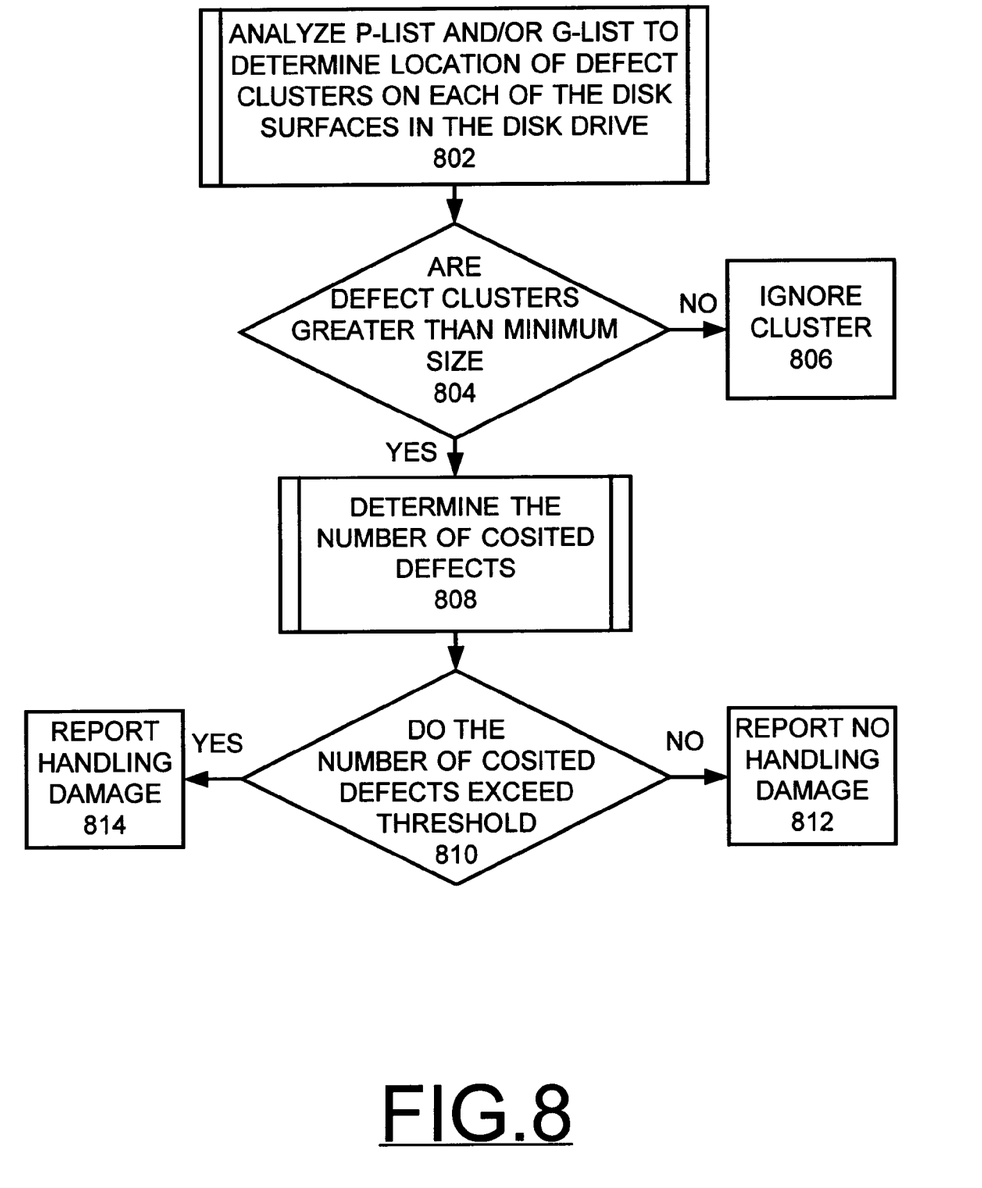
FIG. 8 is a flow diagram illustrating sequential steps for cluster and cosited defect analysis for detecting handling damage in the data storage disk file of FIG. 1 in accordance with the present invention.

FIG. 8 is a flow diagram illustrating sequential steps for cluster and cosited defect analysis routine for detecting handling damage in the data storage disk file 10. The P-list and/or G-list are analyzed to determine the location of defect clusters on each of the disk surfaces 20 in the disk drive unit 12 as indicated at it block 802. Checking whether the defect clusters are greater than a minimum size is performed as indicated at a decision block 804. If the defect cluster is not greater than the minimum size, then the cluster is ignored as indicated at a block 806. When the defect clusters are greater than the minimum size, then a defect analysis routine is performed to determine the number of cosited defects as indicated at a block 808. Checking whether the number of cosited defects exceed a set threshold is performed as indicated at a decision block 810. If the number of cosited defects do not exceed the set threshold, then no handling damage is reported as indicated at a block 812. When the number of cosited defects exceed the set threshold, then handling damage is reported as indicated at a block 814.

Figure 9:
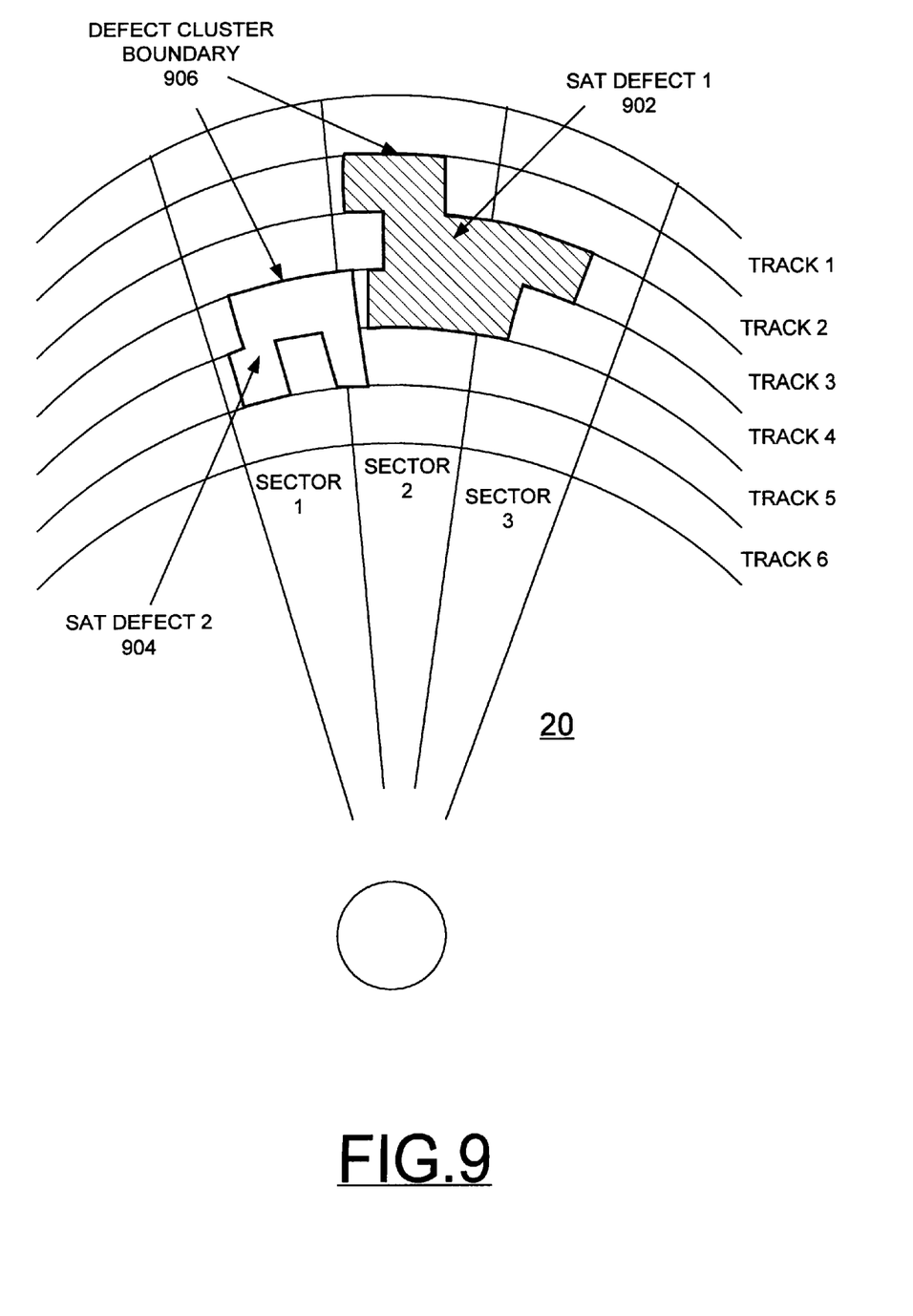
FIG. 9 is a schematic diagram showing an exemplary single disk surface illustrating an exemplary defect cluster boundary for a pair of exemplary surface analysis test (SAT) defects in the data storage disk file of FIG. 1 in accordance with the present invention.

FIG. 9 is a schematic diagram showing an exemplary single disk surface 20 illustrating an exemplary defect cluster boundary for a pair of exemplary surface analysis test (SAT) defects SAT DEFECT 1 902 and SAT DEFECT 2 904. As shown, SAT DEFECT 1 902 lies principally between tracks 2 and 4 and is contained within sectors 2 and 3. SAT DEFECT 2 904 is located in sectors 1 and 2 and lies between tracks 4 and 5. A cluster analysis performed at block 712 in FIG. 7 determines that the two defects SAT DEFECT 1 902 and SAT DEFECT 2 904 can be considered as one defect cluster. A defect cluster boundary 906 is identified for the defect cluster including the two defects SAT DEFECT 1 902 and SAT DEFECT 2 904. The defect cluster boundary 906 or equivalent information is used to identify cosited defects.

Figure 10:
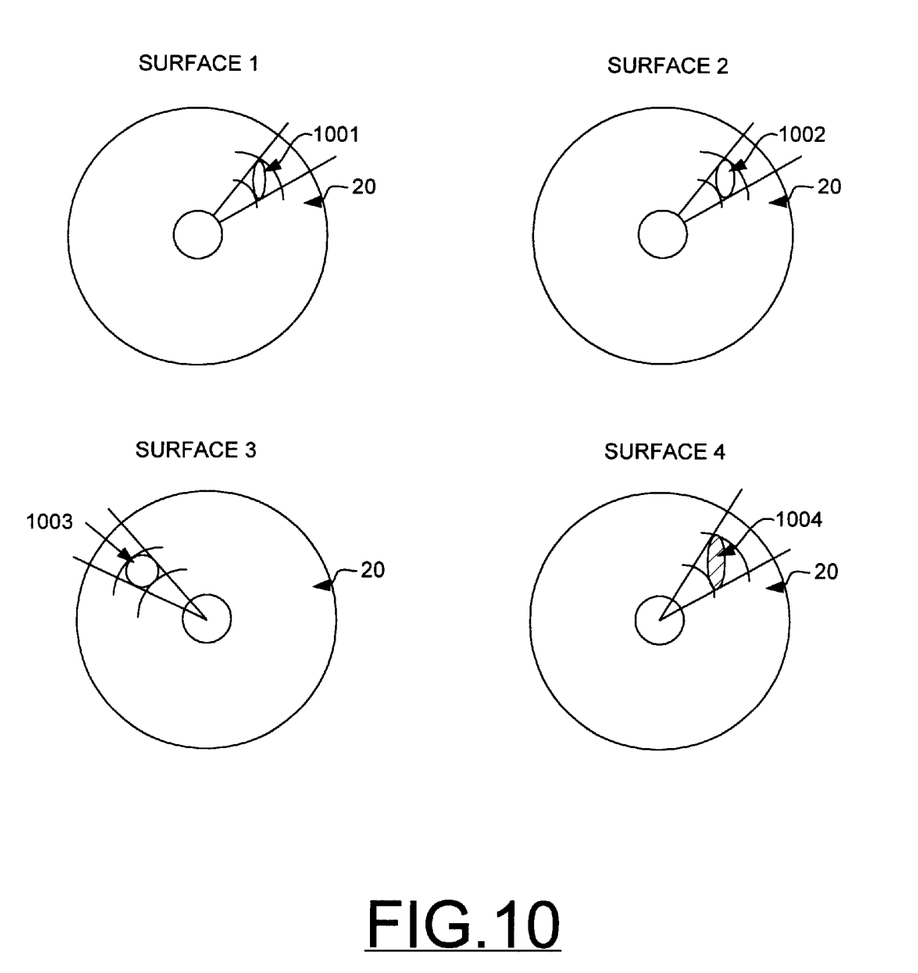
FIG. 10 is a schematic diagram showing four exemplary separate disk surfaces illustrating an exemplary cosited defect on three disk surfaces in the data storage disk file of FIG. 1 in accordance with the present invention.

FIG. 10 is a schematic diagram showing four exemplary separate disk surfaces 20 illustrating a plurality of exemplary cosited defects 1001, 1002, 1004 on three disk surfaces 1, 2 and 4. For example, in FIG. 10, disk surfaces 1, 2, 3, and 4 may represent the surfaces 20 of a hard drive unit 12 including two disks 18. Two-disk drives are frequently used in portable computers, such as notebook computers. The cosited defects 1001, 1002, 1004 on disk surfaces 1, 2 and 4 appear at approximately the same radius and angle on each surface as shown in FIG. 10. The cosited defects 1001, 1002, 1004 occurred at approximately the same radius and circumferential position. Such cosited defects are associated with handling damage. On disk surface 3, a defect 1003 exists that is not correlated with the cosited defects 1001, 1002, 1004 on disk surfaces 1, 2 and 4. The defect 1003 on surface 3 is not likely caused by handling damage, because other cosited defects have not occurred in the disk drive unit 12.

An exemplary pseudo code listing is provided for analyzing SAT data from P-list and G-list to identify cosited defects indicative of handling damage in disk file 10. It should be understood that various other program sequences can be used for analyzing SAT data from P-list and G-list to identify cosited defects indicative of handling damage within the scope of the invention.

EXAMPLE PROGRAM

```
/* Surface Analysis Defect C Program for PLIST data */
/*Find, report any SAT defects that have cylindrical */
/*adjacency in the disk stack */
/*Pseudo code only */
/*Define a Structure to contain SAT PLIST defects */
struct sat_plist {
    byte    head;
    word    track;
    byte    start_sector;
    word    start_count;
    byte    end_sector;
    word    end_count;
};
/*Define a Structure to contain defect clusters */
struct cluster {
    int head;
    int lower_track_boundary;
    int upper_track_boundary;
    int lower_sector_boundary;
    int upper_sector_boundary;
    long int cluster_area;
};
```

-continued

```
struct sat_plist  defect_matrix;
struct cluster    cluster_matrix;
void main( ) {
/*Read PLIST data into a matrix called plist_matrix */
fmread(defect_matrix,size1,size2,"plist_datafile.bin");
/*Join several defects in a sector on a single track */
/*into a single defect */
defect_matrix =
joiner(defect_matrix,sector_count_tolerance);
/*Eliminate defects that have no track adjacency */
defect_matrix = sifter(defect_matrix,track_tolerance);
/*Reduce the defect_matrix into clusters */
/*Clusters have a defined minimum length and width */
/*Typical values are minimum_cluster_width = 2, */
/*minimum_cluster_length = 2 */
cluster_matrix =
clusters(defect_matrix,minimum_cluster_width,minimum_
cluster_length);
/*Analyze cluster_matrix to determine if any defects */
/*align cylindically in the disk stack */
/*A clindrical_tolerance is a 2-element vector that */
/*defines the allowable radial and */
/*tangential tolerance allowable to retain the */
/*cylindrical adjacency of clusters in the stack */
co_sited_defects =
piler(cluster_matrix,cylindrical_tolerance);
/*Print the list of defects */
print_defect_list(std_out,co_sited_defects);
} /* end main */
```

The P-list and/or G-list identifying the magnetic surface defect sites in a disk drive have a standard content as shown below in an EXAMPLE INPUT. The P-list and G-list include head, cylinder, start sector, start servo identification (SID), stop sector and stop SID for magnetic surface defects. The head, cylinder, and sector location are given with the servo identification (SID) count to position the defective area within the sector at a given cylinder and head precisely. Column 4 and 6 in the EXAMPLE INPUT show the start and ending SID count for the magnetic defect. For example referring to the first entry below includes head (surface) 1, cylinder 50, sector 31, a magnetic defect that starts on SID count 325 and ends on SID count 689.

EXAMPLE INPUT

NOTE: All tolerances set to 2 defect_matrix {

| | | | | | |
|---|---|---|---|---|---|
| 1 | 50 | 31 | 325 | 31 | 689 |
| 1 | 51 | 31 | 350 | 31 | 644 |
| 1 | 52 | 31 | 302 | 31 | 789 |
| 1 | 53 | 31 | 325 | 31 | 900 |
| 1 | 54 | 31 | 299 | 31 | 890 |
| 1 | 55 | 3i | 341 | 31 | 877 |
| 1 | 56 | 31 | 324 | 31 | 788 |
| 1 | 57 | 3i | 329 | 31 | 793 |
| 1 | 58 | 31 | 311 | 31 | 688 |
| 1 | 59 | 31 | 377 | 31 | 700 |
| 1 | 60 | 31 | 370 | 31 | 679 |
| 1 | 61 | 31 | 297 | 31 | 789 |
| 1 | 62 | 31 | 309 | 31 | 735 |
| 1 | 63 | 31 | 258 | 31 | 620 |
| 1 | 64 | 31 | 296 | 31 | 788 |
| 1 | 65 | 31 | 340 | 31 | 1003 |
| 1 | 66 | 31 | 340 | 31 | 998 |
| 1 | 67 | 31 | 388 | 31 | 1100 |
| 1 | 68 | 31 | 399 | 31 | 1001 |
| 1 | 69 | 31 | 328 | 31 | 929 |
| 1 | 70 | 31 | 338 | 31 | 900 |
| 3 | 50 | 31 | 325 | 31 | 680 |
| 3 | 51 | 31 | 360 | 31 | 604 |

-continued

| | | | | | |
|---|---|---|---|---|---|
| 3 | 52 | 31 | 302 | 31 | 709 |
| 3 | 53 | 31 | 325 | 31 | 901 |
| 3 | 54 | 31 | 299 | 31 | 800 |
| 3 | 55 | 31 | 341 | 31 | 807 |
| 3 | 56 | 31 | 324 | 31 | 788 |
| 3 | 57 | 31 | 329 | 31 | 713 |
| 3 | 58 | 31 | 311 | 31 | 618 |
| 3 | 59 | 31 | 227 | 31 | 701 |
| 3 | 60 | 31 | 474 | 31 | 671 |
| 3 | 61 | 31 | 292 | 31 | 719 |
| 3 | 62 | 31 | 426 | 31 | 715 |
| 3 | 63 | 31 | 557 | 31 | 629 |
| 3 | 64 | 31 | 298 | 31 | 783 |
| 3 | 65 | 31 | 421 | 31 | 1103 |
| 3 | 66 | 31 | 344 | 31 | 1100 |
| 3 | 67 | 31 | 386 | 31 | 1001 |
| 3 | 68 | 31 | 639 | 31 | 869 |
| 3 | 69 | 31 | 248 | 31 | 615 |
| 3 | 70 | 31 | 338 | 31 | 720 |
| 5 | 57 | 31 | 325 | 31 | 680 |
| 5 | 58 | 31 | 360 | 31 | 634 |
| 5 | 59 | 31 | 302 | 34 | 709 |
| 5 | 60 | 31 | 315 | 31 | 901 |
| 5 | 61 | 31 | 279 | 31 | 810 |
| 5 | 62 | 31 | 349 | 31 | 807 |
| 5 | 63 | 31 | 324 | 31 | 788 |
| 5 | 64 | 31 | 329 | 31 | 713 |
| 5 | 65 | 31 | 307 | 31 | 618 |
| 5 | 66 | 31 | 226 | 31 | 701 |
| 5 | 67 | 31 | 474 | 31 | 671 |
| 5 | 68 | 31 | 193 | 31 | 619 |
| 5 | 69 | 31 | 329 | 31 | 715 |
| 5 | 70 | 31 | 557 | 31 | 629 |
| 5 | 71 | 31 | 396 | 31 | 783 |
| 5 | 72 | 31 | 421 | 31 | 1103 |
| 5 | 73 | 31 | 324 | 31 | 919 |
| 5 | 74 | 3i | 386 | 31 | 992 |
| 5 | 75 | 31 | 639 | 31 | 931 |
| 5 | 76 | 31 | 248 | 31 | 809 |
| 5 | 77 | 31 | 289 | 31 | 777 |
| 5 | 78 | 31 | 111 | 31 | 267 |
| 5 | 80 | 31 | 100 | 31 | 2130 |
| 5 | 81 | 31 | 129 | 31 | 2222 |
| 5 | 82 | 31 | 300 | 31 | 489 |
| }; | | | | | |

EXAMPLE RESULTS SUMMARY

| | | | | | |
|---|---|---|---|---|---|
| cluster_matrix = { | | | | | |
| 1 | 50 | 70 | 331 | 31 | 26515 |
| 3 | 50 | 70 | 31 | 31 | 24319 |
| 5 | 57 | 78 | 31 | 31 | 23626 |
| 5 | 80 | 82 | 31 | 31 | 10711 |
| }; | | | | | |

The defects with cylindrical adjacency are: Heads: 1 3 5, from track: 57 to 70, sector 31.

While the present invention has been described with reference to the details of the embodiments of the invention shown in the drawing, these details are not intended to limit the scope of the invention as claimed in the appended claims.

What is claimed is:

1. A method for detecting handling damage in a direct access storage device (DASD), the DASD having at least two magnetic disk surfaces provided by at least one disk mounted for rotation, and a corresponding transducer mounted for movement across each disk surfaces, said method comprising the steps of:

receiving a user request to perform handling damage analysis;

performing a predefined surface analysis test (SAT) to identify magnetic surface defects on each of said disk surfaces responsive to said user request;

utilizing identified magnetic surface defects to identify cosited defects on at least two magnetic disk surfaces; and reporting handling damage responsive to identifying a predefined number of cosited defects on at least two magnetic disk surfaces.

2. A method for detecting handling damage in a direct access storage device as recited in claim 1 wherein said step of receiving said user request includes the steps of receiving a user request to perform handling damage analysis responsive to a predetermined event, and said step of performing said predefined surface analysis test (SAT) on each of said disk surfaces to identify magnetic surface defects is responsive to said predetermined event.

3. A method for detecting handling damage in a direct access storage device as recited in claim 2 includes the step of checking for said predetermined event including said direct access storage device entering a power savings mode.

4. A method for detecting handling damage in a direct access storage device as recited in claim 2 includes the step of checking for said predetermined event including identifying new defects in said direct access storage device.

5. A method for detecting handling damage in a direct access storage device as recited in claim 1 wherein said step of performing said predefined surface analysis test (SAT) on each of said disk surfaces to identify magnetic surface defects includes the steps of performing said SAT and storing a list of defect sites, and utilizing said stored list of defect sites for said SAT to identify magnetic surface defects.

6. A method for detecting handling damage in a direct access storage device as recited in claim 1 wherein said step of utilizing identified magnetic surface defects to identify cosited defects on at least two magnetic disk surfaces includes the steps of analyzing identified magnetic surface defects to identify defect clusters on each of said magnetic disk surfaces; comparing each identified defect cluster with a minimum size value to identify defect clusters.

7. A method for detecting handling damage in a direct access storage device as recited in claim 6 further includes the steps of determining a number of cosited defects of each said compared defect cluster greater than said minimum size value and comparing said number with a threshold value.

8. A method for detecting handling damage in a direct access storage device as recited in claim 7 further includes the step of reporting handling damage responsive to said compared number being greater than said threshold value.

9. A method for detecting handling damage in a direct access storage device as recited in claim 7 further includes the step of reporting no handling damage responsive to said compared number being less than or equal to said threshold value.

10. A method for detecting handling damage in a direct access storage device as recited in claim 1 includes the step of identifying a predetermined event in said direct access storage device and performing said predefined surface analysis test (SAT) to identify magnetic surface defects on each of said disk surfaces is responsive to said predetermined event.

11. A method for detecting handling damage in a direct access storage device as recited in claim 1 wherein said step of performing said predefined surface analysis test (SAT) to identify magnetic surface defects on each of said disk surfaces includes the step of checking a stored defect list to identify any new magnetic surface defects.

12. Apparatus for detecting handling damage in a direct access storage device (DASD), the DASD having at least two magnetic disk surfaces provided by at least one disk mounted for rotation, and a corresponding transducer mounted for movement across each disk surfaces, said apparatus comprising:

means for receiving a user request to perform handling damage analysis;

means for performing a predefined surface analysis test (SAT) to identify magnetic surface defects on each of said disk surfaces responsive to said user request;

means, utilizing identified magnetic surface defects, for identifying cosited defects on at least two magnetic disk surfaces; and means for reporting handling damage responsive to identifying a predefined number of cosited defects on at least two magnetic disk surfaces.

13. Apparatus for detecting handling damage in a direct access storage device as recited in claim 12 wherein said direct access storage device includes a controller, a random access memory coupled to said controller and a host interface, and wherein said means for performing said predefined surface analysis test (SAT) to identify magnetic surface defects on each of said disk surfaces and said means, utilizing identified magnetic surface defects, for identifying cosited defects on at least two magnetic disk surfaces include a microcode routine stored in said random access memory for directing said controller to perform predefined steps.

14. Apparatus for detecting handling damage in a direct access storage device as recited in claim 13 wherein said means for reporting handling damage responsive to identifying a predefined number of cosited defects on at least two magnetic disk surfaces include stored microcode for directing said controller to report identified handling damage to said host interface.

15. Apparatus for detecting handling damage in a direct access storage device as recited in claim 12 wherein said means for receiving a user request to perform handling damage analysis includes means for receiving said user request to perform handling damage analysis responsive to a predefined event and further includes means for identifying said predefined event and wherein said means for performing said predefined surface analysis test (SAT) to identify magnetic surface defects on each of said disk surfaces is responsive to said means for identifying said predefined event.

16. A direct access storage device (DASD) comprising:

at least two magnetic disk surfaces mounted for rotation;

a corresponding transducer mounted for movement across each disk surfaces, means for receiving a user request to perform handling damage analysis;

means for performing a predefined surface analysis test (SAT) to identify magnetic surface defects on each of said disk surfaces responsive to said user request;

means, utilizing identified magnetic surface defects, for identifying cosited defects on at least two magnetic disk surfaces; and means for reporting handling damage responsive to identifying a predefined number of cosited defects on at least two magnetic disk surfaces.

* * * * *